FIG. I

INVENTORS
WILLIAM J. HOLM
BY LYMAN D. BICKFORD
Moss, Altman & Oates
ATTORNEYS

Oct. 13, 1970   W. J. HOLM ET AL   3,534,188
SEAM PROTECTION SYSTEM FOR CLOTH SHEARING MACHINES
Filed June 26, 1969   3 Sheets-Sheet 2

INVENTORS
WILLIAM J. HOLM
BY LYMAN D. BICKFORD
ATTORNEYS

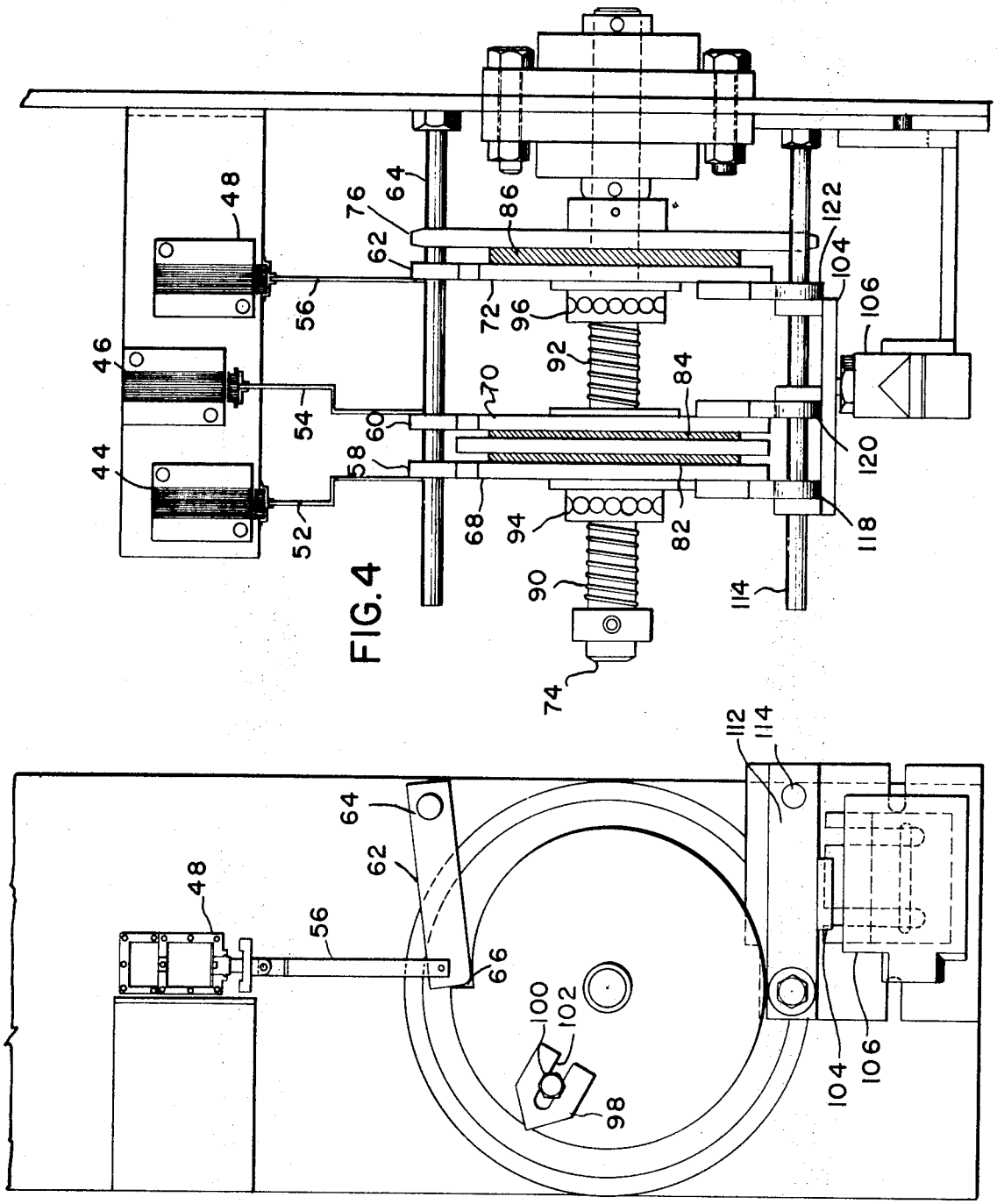

United States Patent Office 3,534,188
Patented Oct. 13, 1970

3,534,188
SEAM PROTECTION SYSTEM FOR CLOTH SHEARING MACHINES
William J. Holm and Lyman D. Bickford, Springfield, Vt., assignors to Riggs & Lombard, Inc., Lowell, Mass., a corporation of Massachusetts
Filed June 26, 1969, Ser. No. 836,847
Int. Cl. B65h 25/14; D06c 13/02
U.S. Cl. 200—61.14                                    7 Claims

ABSTRACT OF THE DISCLOSURE

Apparatus is provided for detecting the presence of a seam in a running cloth web passing through a cloth shearing machine and raising the shearing head to permit the seam to move past the shearing elements without damage. Seam detecting devices responsive to skewed or straight seams energize solenoids which initiate a time delay mechanism having separately actuated components each of which actuates the blade raising mechanism when the seam reaches the shearing elements.

BACKGROUND OF THE INVENTION

Field of the invention

This invention relates generally to cloth shearing machines and more particularly is directed towards a seam protection system for cloth shearing machines.

History of the prior art

In the production of many types of textiles it is the practice to pass fabric in open width form through a cloth shearing machine in order to trim to a uniform height upstanding cloth fibers. In practice, lengths of fabric are joined in end-to-end relation by sewing the trailing end of one length to the leading end of another length so as to maintain a continuous run of cloth through the machine. The seam formed by the joining of the two fabric sections is thicker than the remaining portion of the cloth and as such would be cut through by the closely spaced shearing elements if appropriate measures were not taken to accommodate the seam. While various types of seam protection devices have been available heretofore for cloth shearing machines they have not been entirely satisfactory for one reason or another. For example, such seam protector devices have not always been responsive to skewed seams, have been difficult to time properly or have been relatively complex and expensive.

Accordingly, it is an object of the present invention to provide improvements in seam detecting and protective mechanisms for cloth shearing machines. Another object of this invention is to provide a seam detecting and protective system for cloth shearing machines which is responsive to skewed seams, reliable and synchronized with the movement of the seam to insure opening of the shearing gap at the proper moment.

Summary of the invention

This invention features a seam detecting and protective system for a cloth shearing machine comprising seam detecting means arrayed across the width of the fabric and adapted to be actuated by a passing seam or any portion thereof. Each of the seam detecting means separately actuates a portion of a time delay mechanism synchronized with the speed of the cloth and adapted to actuate a blade-raising mechanism as the seam passes through the shearing elements.

Brief description of the drawings

FIG. 3 is a detailed view in side elevation of the time delay unit employed in the invention, and FIG. 4 is a view in front elevation of the FIG. 3 mechanism.

Detailed description of the preferred embodiment

Figure 1:
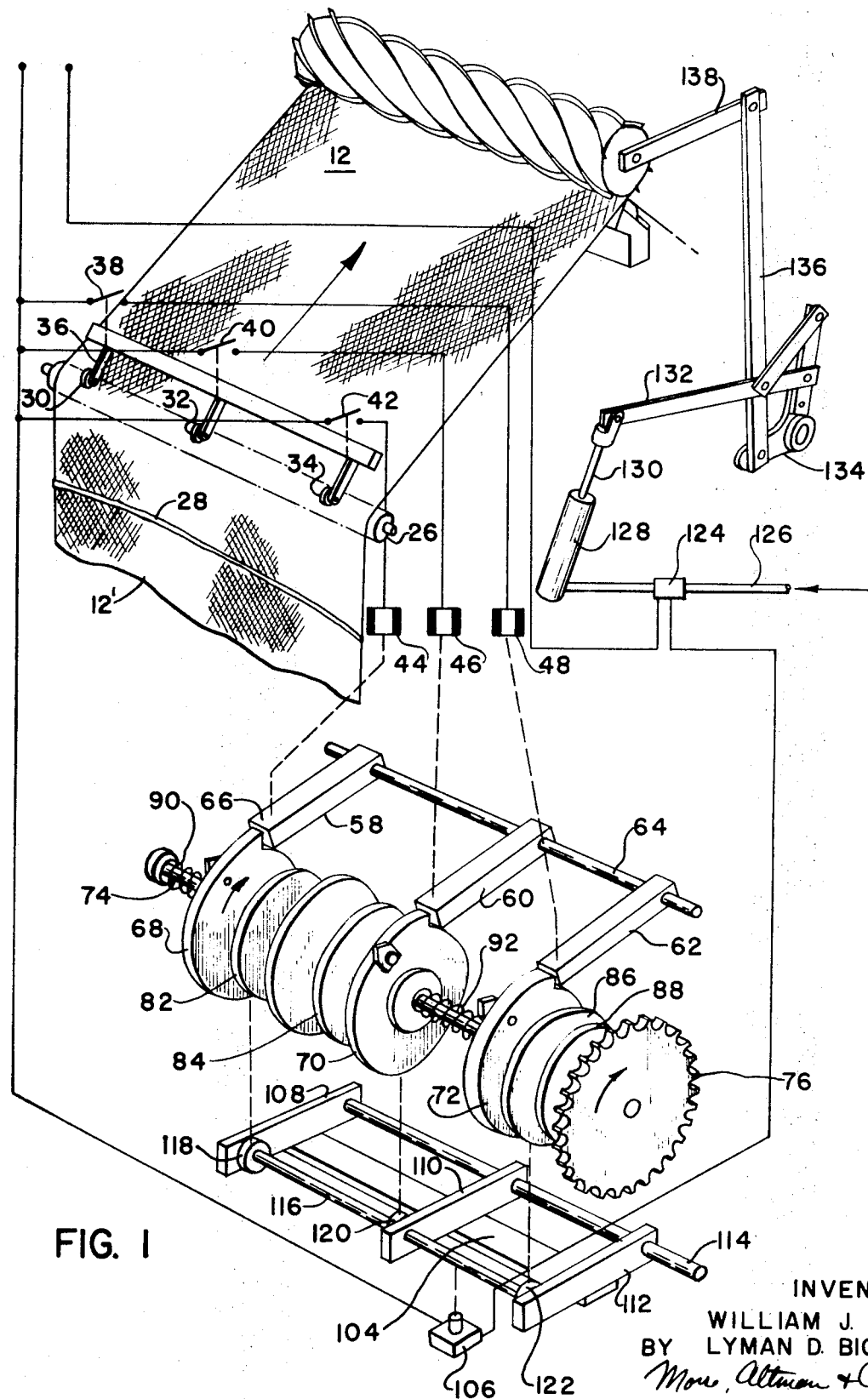
FIG. 1 is a somewhat schematic perspective view of a seam detection and protection system made according to the invention.
Figure 2:
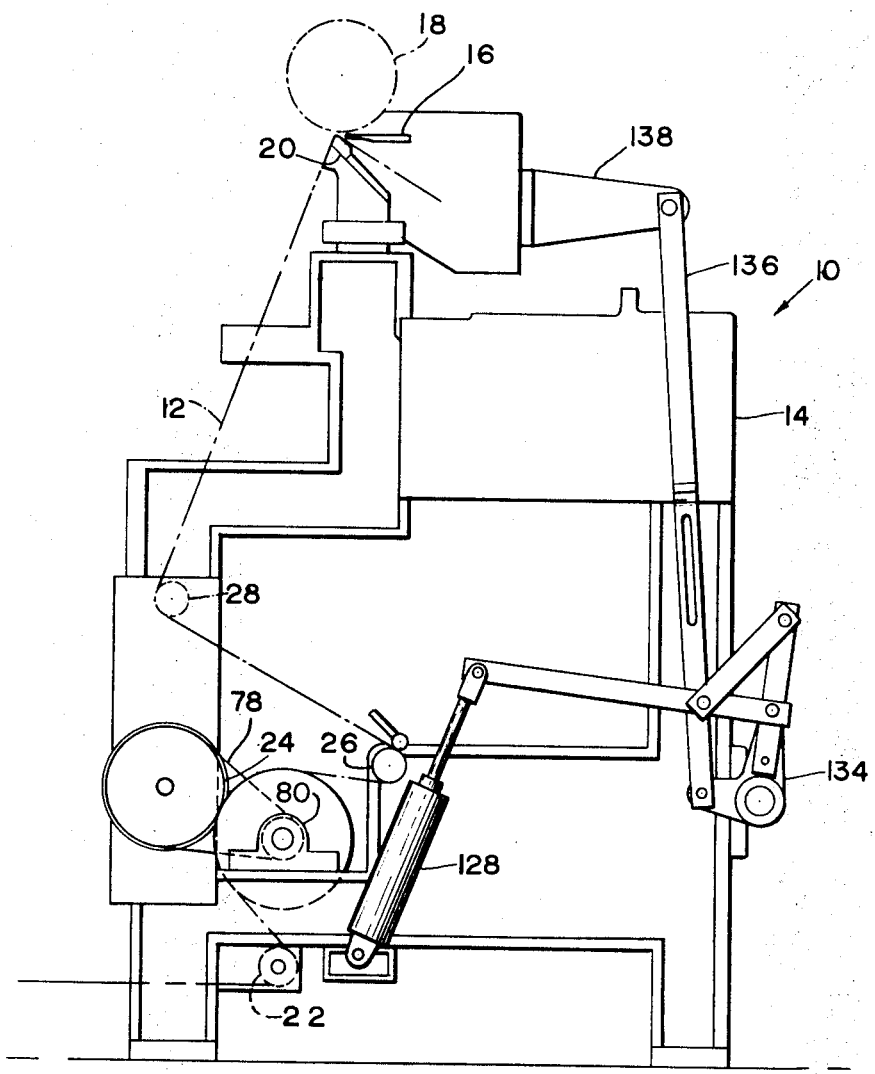
FIG. 2 is a sectional view in side elevation of a cloth shearing machine incorporating the invention.

Referring now to the drawings the reference character 10 generally indicates a cloth shearing machine for an open width fabric 12 feed lengthwise through the machine. The shearing machine is organized about a frame 14 to which is mounted a shearing assembly comprised of a ledger knife 16 mounted for cooperative shearing engagement with a shearing revolver 18, these components being mounted in closely spaced relation adjacent a fixed cloth rest 20 over which the fabric 12 is passed in open width form. The cloth 12 is fed through the machine about an idler roller 22, a draft roll 24, idler rollers 26, 28 and thence over the cloth rest 20 where the shearing action takes place. The shearing machine may have other shearing heads to shear both sides of the fabric, as desired, and the shorn cloth and can be wrapped up on a take up roll or carried on for further processing.

In practice, one length of fabric 12 will be connected in end-to-end relation with another length of fabric 12' as by sewing the ends together. A seam 28 formed thereby extends transversely of the fabric and customarily is somewhat thicker than the web. Since the shearing elements are mounted in close proximity to the web for proper shearing action it is necessary to move the shearing elements apart when the seam passes through to avoid cutting through the seam.

In accordance with the invention, the seam 28 is detected by seam sensing means such as a plurality of seam-detecting rollers 30, 32 and 34 arrayed across the width of the fabric oppositely one of the idler rolls such as roll 26, for example. Each of the seam-detecting rollers is mounted on a movable arm 36 operatively connected to an associated normally open switch 38, 40 and 42 connected to cooperating solenoids 44, 46 and 48. Additional detecting rollers may be provided if desired. By employing a number of seam-detecting rollers across the width of the web, it is possible to detect a straight or a skewed seam and to initiate the seam-protection system accordingly. Other seam sensing means operatively connected to the solenoids may also be used to advantage.

Each of the solenoids 44, 46 and 48 operates an associated connecting rod 52, 54 and 56 each of which rods pivotally connects to the end of an associated latch or cam stop bar 58, 60 and 62, all of these cam stop bars being pivotally supported on a rod 64. The free end of each cam stop bar normally latches against a shoulder stop 66, formed on each of a rotary cam 68, 70 and 72 associated with each cam stop bar. The cams 68, 70 and 72 are freely mounted to a supporting shaft 74 driven by means of a gear 76 in mesh with a chain 78 also in mesh with a gear 80 connected to the draft roll 24. The shaft 74 also carries a plurality of clutch discs 82, 84, 86 and 88 with compression springs 90 and 92 provided to apply pressure on the clutch elements through bearings 94 and 96. Each of the rotary cams is provided with a trip or detector bar dog 98 mounted for radial adjustment to the cam by means of a bolt 100 and slot 102. The outer end of each dog 98 extends beyond the periphery of the cam and upon rotation of the cam is adapted to bias a detector bar 104 against a micro switch 106. The detector bar is secured to the underside of a frame comprised of arms 108, 110 and 112 pivoted about a supporting shaft 114 and connected by means of a parallel rod 116. Rod 116 is provided with a set of follower rollers 118, 120 and 122 in position to engage a related dog 98.

It will be understood that the solenoids 44, 46 and 48 may be energized in unison where the seam extends straight across the web or may be energized in sequence where the seam extends diagonally across the web. A bowed seam will change the sequence of operation. In any event, whenever a seam is detected one or more of the solenoids will be energized to lift its associated cam stop bar clear of the shoulder stop 66 for its associated cam. When this happens the cam or cams will start to rotate clockwise as viewed in FIG. 3 and the associated dog 98 will rotate around until it engages a follower roller so as to bias the detector bar 104 against the microswitch 106. The cam thus serves as a time delay to compensate for the distance the seam must travel between the seam detecting rollers, 30, 32 and 34 and the shearing elements. Since the timing shaft 74 is driven by the draft roll 24, the timing unit will be synchronized with the speed of the cloth. Each detector solenoid and timing cam operates independently of one another so as to cover bowed, skewed or straight seams.

The micro switch 106 operates a solenoid valve 124 in an air supply line 126 connected to a pneumatic cylinder 128. The cylinder 128 is provided with a rod 130 connected to the end of a lever arm 132. The lever arm 132 in turn operates a crank arm 134 which operates a shipping rod 136. The shipping rod biases a lever arm 138 which raises the blade frame of the cutting assembly allowing the seam to pass over the cloth rest. The duration that the blade frame will be lifted is determined by the detecting rollers and in any event the blade frame will be open for a time sufficient to pass any seam regardless of how skewed or bowed it may be. Alternatively, the cloth rest may be moved to open the shearing gap as desired.

Having thus described the invention what we claim and desire to obtain by Letters Patent of the United States is:

1. A seam protection system for cloth shearing machines and the like having relatively movable shearing elements, comprising
    (a) a plurality of seam sensing means each responsive to the presence of a different segment of a seam on a running cloth web,
    (b) a plurality of solenoids each operatively connected to each of said seam sensing means,
    (c) rotary timing means including a plurality of rotary timing members each operatively associated with each of said solenoids,
    (d) power means normally urging said members to rotate,
    (e) restraining means associated with each member and individually controlled by said solenoids for normally preventing rotation of said member,
    (f) moving means for moving said shearing elements apart,
    (g) actuating means operatively connected to said moving means and responsive to any one of said timing members,
    (h) at least one of said sensing means being operative to sense said seam, energize at least one of said solenoids to disable at least one of said restraining means to permit at least one of said members to rotate and actuate said actuating means to thereby operate said moving means.

2. A seam protection system according to claim 1 wherein said seam sensing means includes a plurality of rollers spaced across the width of said cloth web and a switch operatively associated with each of said rollers and an associated solenoid.

3. A seam protection system according to claim 1 wherein said rotary timing means includes a plurality of discs each having a shoulder stop formed thereon and a slip clutch connecting said discs to said power means, said restraining means including a latch operatively connected to each of said solenoids and engageable with the stop of each disc and movable out of engagement upon energization of one of said solenoids.

4. A seam protection system according to claim 1 wherein said power means is synchronized with the movement of said cloth web.

5. A seam protection system according to claim 1 wherein said actuating means includes a movable arm and an actuating switch, said arm being movable against said switch in response to any one of said timing members.

6. A seam protection system according to claim 5 wherein said actuating means further includes a piston and cylinder drivingly connected to said shearing elements and a valve connecting said cylinder to a fluid pressure source and operatively connected to said actuating switch.

7. A seam protection system according to claim 3 wherein each of said discs includes a trip adapted to actuate said actuating means at a preselected point upon rotation of said discs.

References Cited
UNITED STATES PATENTS

| | | | |
|---|---|---|---|
| 2,247,733 | 7/1941 | Rotherham | 26—17 |
| 2,523,184 | 9/1950 | Beall | 200—61.14 XR |
| 3,099,871 | 8/1963 | Dourdeville | 26—17 |

ROBERT K. SCHAEFER, Primary Examiner

M. GINSBURG, Assistant Examiner

U.S. Cl. X.R.

26—17